(12) United States Patent
Sasaki

(10) Patent No.: US 7,102,668 B2
(45) Date of Patent: Sep. 5, 2006

(54) ELECTRONIC STILL CAMERA WITH PRINTER SECTION

(75) Inventor: Hidemi Sasaki, Saitama (JP)

(73) Assignee: Fuji Photo Film Co., Ltd, Minami-Ashigara (JP)

( * ) Notice: Subject to any disclaimer, the term of this patent is extended or adjusted under 35 U.S.C. 154(b) by 656 days.

(21) Appl. No.: 10/127,546

(22) Filed: Apr. 23, 2002

(65) Prior Publication Data

US 2002/0154222 A1    Oct. 24, 2002

(30) Foreign Application Priority Data

Apr. 24, 2001  (JP) .............................. 2001-125891

(51) Int. Cl.
*H04N 5/225* (2006.01)
(52) U.S. Cl. ............................. 348/207.2; 348/207.99
(58) Field of Classification Search ................ 358/1.1, 358/1.12, 304, 347, 270, 226; 347/241, 256, 347/262; 348/207.2
See application file for complete search history.

(56) References Cited

U.S. PATENT DOCUMENTS 6,276,850 B1 * 8/2001 Silverbrook et al. ...... 400/615.2
6,317,156 B1 * 11/2001 Nagasaki et al. .......... 348/373
6,774,933 B1 * 8/2004 Suzuki ..................... 348/207.2

FOREIGN PATENT DOCUMENTS

| JP | 10-257427 | 9/1998 |
| JP | 11-249233 | 9/1999 |
| JP | 11-317897 | 11/1999 |

* cited by examiner

*Primary Examiner*—Tuan Ho
*Assistant Examiner*—Anthony Daniels
(74) *Attorney, Agent, or Firm*—McGinn IP Law Group, PLLC

(57) ABSTRACT

There is disclosed an electronic still camera with a printer section for printing an image on recording paper on the basis of image data obtained through a camera section of the camera. A paper roll chamber is formed around a lens barrel which holds a taking lens therein. A roll of recording paper, which is wound around a reel, is loaded in the paper roll chamber by fitting a center hole of the reel on the lens barrel. A lid for opening and closing the paper roll chamber is disposed on the front side of the camera. The lid has an opening for exposing the taking lens while the lid is closed.

18 Claims, 7 Drawing Sheets

ELECTRONIC STILL CAMERA WITH PRINTER SECTION

BACKGROUND OF THE INVENTION

1. Field of the Invention

The present invention relates to an electronic still camera with a printer section, and more particularly to a compact electronic still camera provided with a printer section that prints an image on recording paper on the basis of image data of a subject photographed through a taking lens, and a paper roll chamber for holding a roll of recording paper.

2. Background Arts

Electronic still cameras with a printer section therein have been developed and marketed. In many of such electronic still cameras, the printer section constitutes a photographic printer that prints an image on a self-developing photographic film such as a mono-sheet type instant film, as disclosed in JPA No. 11-249233. The photographic printer for the instant film takes a small space and consumes less power. Moreover, this type of electronic still camera may be loaded with a film pack containing a number of sheets of instant films, like in ordinary instant cameras.

Besides the electronic still camera with the photographic printer section, there have been disclosed an electronic still camera with a thermal printer section that prints an image on a heat sensitive type recording paper, for example in JPA Nos. 11-317897 and 10-257427.

In JPA No. 11-317897, the electronic still camera has the thermal printer section inside a grip which is located on one horizontal side of the camera body. A roll of heat-sensitive recording paper is loaded in a bottom portion inside the grip, whereas a thermal printing head are mounted in an upper portion inside the grip. Feed rollers feeds the heat-sensitive recording paper from the paper roll to the thermal printing head. After the printing, the recording paper is ejected through a slot formed on the top side of the grip.

In the electronic still camera as disclosed in JPA No. 10-257427, a roll of heat-sensitive recording paper is loaded in a grip, and a thermal printing head is located on opposite side of a lens barrel from the grip. The recording paper is fed from the roll to the thermal printing head and. After having an image recorded thereon, the recording paper is ejected through an exit formed on the opposite side from the grip.

Using a roll of recording paper, like in the above prior arts, has advantages that the waste of recording paper is reduced by minimizing margins around the respective images, and that the rolled recording paper is easy to load into the camera body. However, in order to load the recording paper roll in the grip of the camera body, the size of the roll, i.e. the diameter or the width of the roll, must be adjusted to the internal space of the grip. With such a small roll of recording paper, the number of available exposures is limited. Moreover, with the smaller diameter, the rolled recording paper inevitably gets curled the stronger. Providing the camera with a device for flattening the recording paper before the printing is undesirable in terms of compactness of the camera.

To lessen the curl of the rolled recording paper, it may be possible to roll the recording paper with a larger diameter inside the grip, and place a battery or the like inside the paper roll to make the most use of the internal space of the grip. However, since the grip should not be too large to handle, it is hard to accommodate the paper roll with a large diameter in the grip.

SUMMARY OF THE INVENTION

In view of the foregoing, an object of the present invention is to provide an electronic still camera with a printer section, that can accommodate a paper roll with a large diameter without lowering the space efficiency of the camera body.

To achieve the above and other objects, an electronic still camera according to the present invention comprises a camera section for obtaining electronic image data from a subject photographed through a taking lens; a printer section for printing an image on recording paper on the basis of the image data; and a paper roll chamber formed around a lens barrel of the taking lens, to hold a roll of the recording paper rotatably around the lens barrel; and a lid movable between an open position for opening the paper roll chamber and a closed position for closing the paper roll chamber.

Since the paper roll chamber is provided around the lens barrel, the rolled recording paper may have large radii of curvature so that the recording paper does not get curled strongly. Moreover, the number of prints available from one paper roll is increased without compromising compactness of the electronic still camera.

The lid is preferably disposed on a front side of the camera and has an opening for exposing the taking lens while the lid is in the closed position. According to a preferred embodiment, the camera has a substantially flat front wall, and the lid constitutes a fragment of the front wall in the closed position.

The electronic still camera of the present invention may further comprise a paper feeding device for feeding the recording paper out from the paper roll chamber to the printer section through a paper path, the paper feeding device comprising at least a feed roller disposed in the paper path or in the paper roll chamber. A paper exit is preferably formed through a side wall of the camera, for ejecting a leading portion of the recording paper out of the camera after an image is printed on the leading portion by the printer section, and a cutter disposed near the paper exit, for cutting off the leading portion of the recording paper.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE EMBODIMENTS

Figure 1:
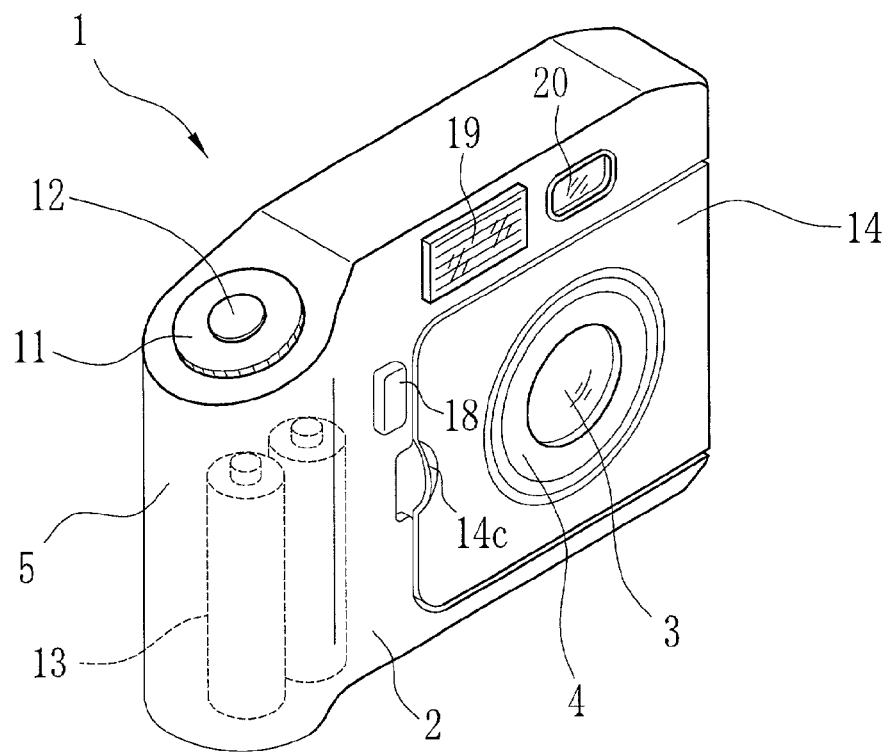
FIG. 1 shows a front perspective view of an electronic still camera with a thermal printer section, according to an embodiment of the present invention.
Figure 2:
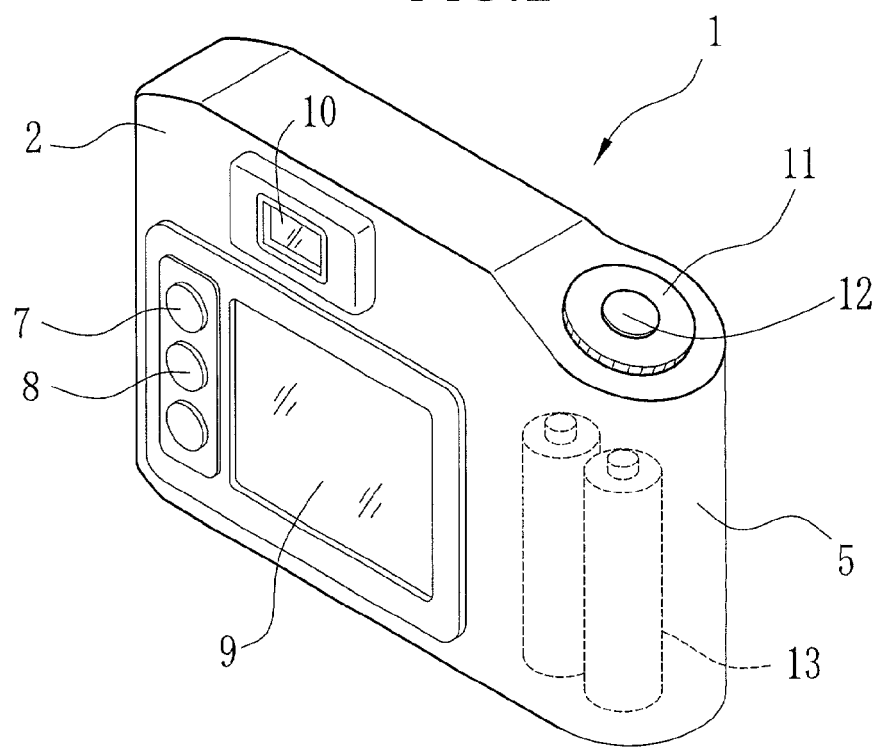
FIG. 2 shows a rear perspective view of the electronic still camera of FIG. 1.

As shown in FIGS. 1 and 2, an electronic still camera 1 with a printer section has a camera body 2 of a horizontally elongated parallelepiped shape. A cylindrical lens barrel 4 holding a taking lens 3 is disposed in the front center of the camera body 2. A grip 5 is disposed on one horizontal side of the camera body 2, and batteries 13 are accommodated in the grip 5. A power switch 7, a print button 8 and other operation buttons are disposed on the rear side of the camera body 2. An LCD panel 9 and an eyepiece window 10 of a real image type viewfinder are also provided on the rear side. An operation dial 11 is provided on the top of the grip 5, and a shutter button 12 is disposed in the center of the operation dial 11. A flash window 19 and an objective window 20 of the real image type viewfinder are disposed above a front lid 14.

Figure 3:
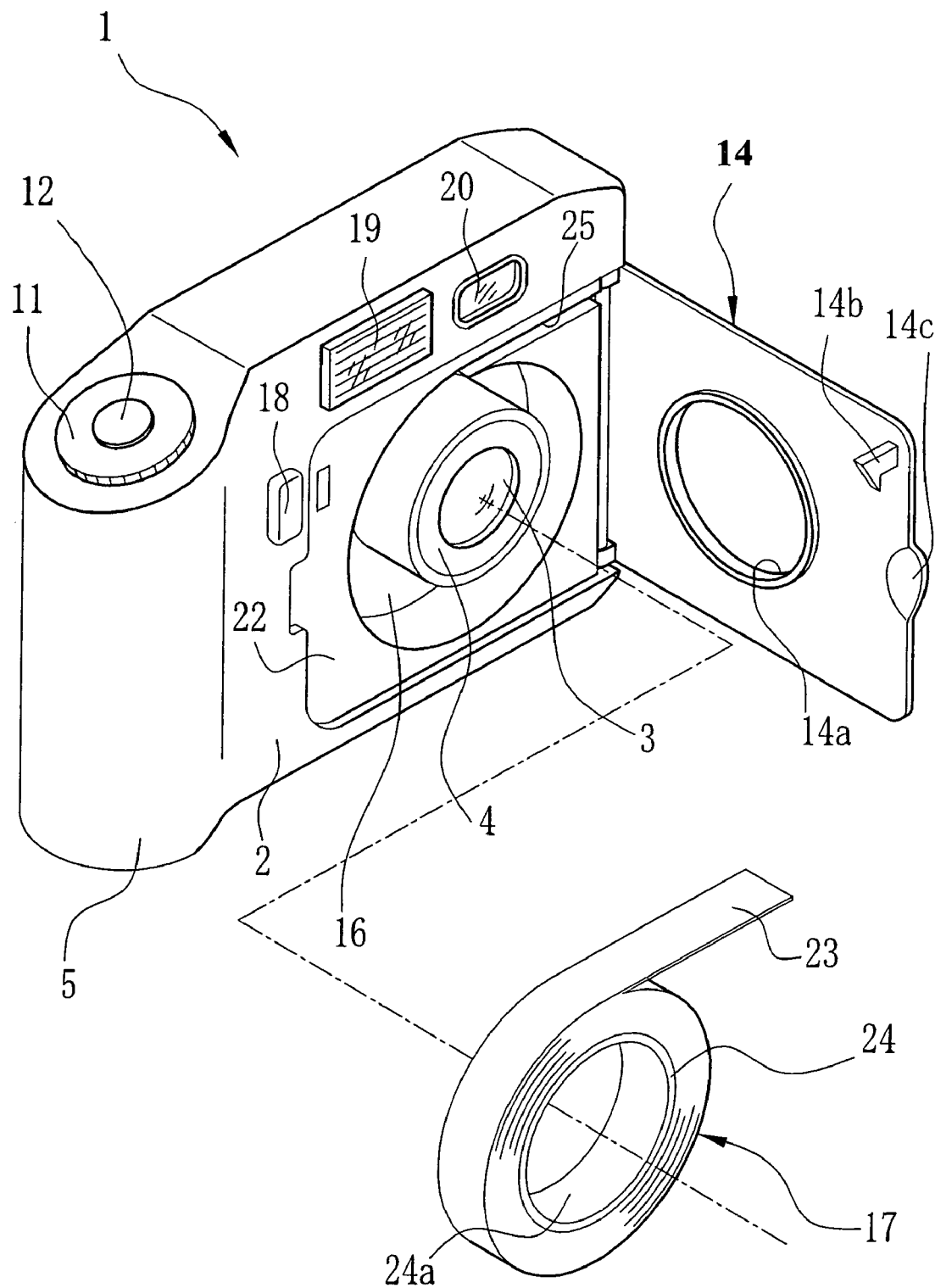
FIG. 3 shows a front perspective view of the electronic still camera with its front lid open and a roll of recording paper to be loaded in the camera.

The front lid 14 is hinged to the other side of the camera body 2 from the grip 5, so that the front lid 14 may swing between an open position to uncover a paper roll chamber 16, as shown in FIG. 3, and a closed position to cover up the paper roll chamber 16, as shown in FIG. 1. The paper roll chamber 16 is formed as an annular cavity around the lens barrel 14, and holds a paper roll 17. The front lid 14 has a round center hole 14a whose diameter is adjusted to an external diameter of the lens barrel 4. In the closed position of the front lid 14, the lens barrel 4 is exposed through the center hole 14a. A recessed portion 22 is formed around the paper roll chamber 16. The recessed portion 22 has a contour and a depth that respectively correspond to a contour and a thickness of the front lid 14, so that the front lid 14 is fitted in the recessed portion 22 in the closed position, and is aligned with the front wall of the camera body 2.

A hook 14b is formed on the inside of the front lid 14. As the front lid 14 is closed, the hook 14b is engaged with a latch mechanism that is not-shown but mounted in the camera body 2, so the front lid 14 is latched in the closed position. The front lid 14 is unlatched by pressing an unlatch button 18. A tab 14c is formed on a distal end of the front lid 14, to make it easy to open the front lid 14.

Figure 4:
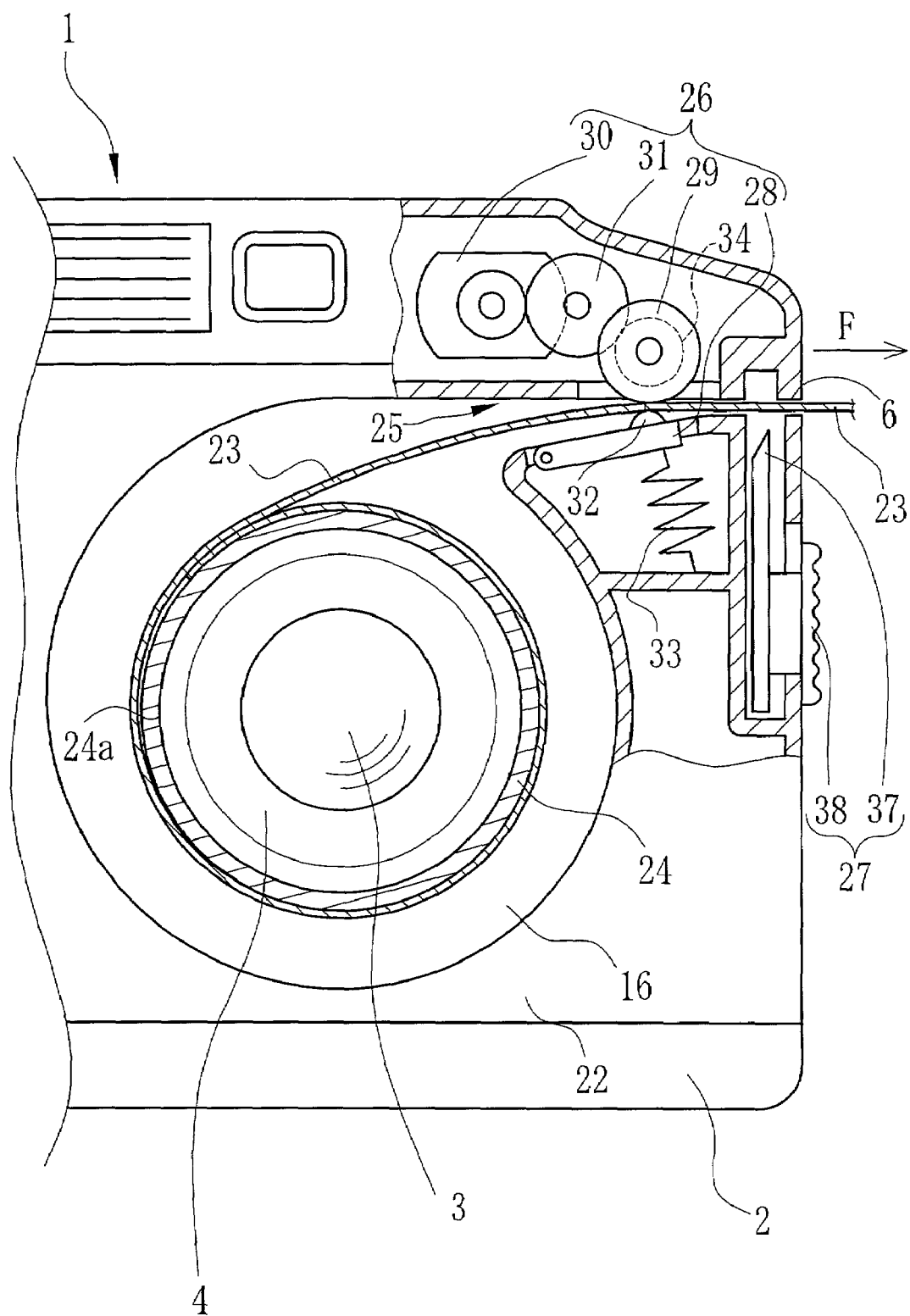
FIG. 4 shows a fragmentary front view, partly broken away, of the electronic still camera of FIG. 1, illustrating essential parts of the thermal printer section.

The paper roll 17 is made by winding a long web of recording paper 23 around a reel 24. In the present embodiment, the recording paper 23 is a heat-sensitive monochrome recording paper that develops a color, e.g. black, when heated up to a predetermined temperature. Before being loaded in the paper roll chamber 16, the paper roll 17 is encased in a moisture- and light-shielding pack or box, and a leading end of the recording paper 23 is secured by an adhesive tape to the outermost periphery of the roll 17, thereby to prevent unwinding. The reel 24 has a round center hole 24a whose internal diameter is slightly greater than an external diameter of the lens barrel 4, so that the reel 24 is rotatably fitted on the lens barrel 4, as shown in FIG. 4. The width of the recording paper 23 is adjusted to the axial length of the lens barrel 4. It is to be noted that FIG. 4 shows the paper roll 17 in a condition where the recording paper 23 is wound just one round around the reel 24 for the clarity sake.

Since the paper roll chamber 16 is provided around the lens barrel 4, radii of curvature of the recording paper 23 on the reel 24 becomes so large that the recording paper 23 does not get curled strongly. Moreover, the entire length of the recording paper 23 on the paper roll 17 is increased, and hence the number of prints available from one paper roll 17 may be increased, without compromising compactness of the electronic still camera 1.

As shown in FIG. 4, the recording paper 23 is fed from the paper roll 17 into a narrow paper path 25 that extends from an upper portion of the paper roll chamber 16 to a paper exit 6 that is formed through an opposite side wall of the camera body 2 from the grip 5. A printer section 26 is disposed above and below the paper path 25, to print an image on the recording paper 23. A cutter 27 is disposed at the paper exit 6 to cut off the leading portion of the recording paper 23 after having the image printed thereon.

The printer section 26 is constituted of a thermal printing head 28, a platen roller 29, a motor 30 and a transmission gear 31. The thermal printing head 28 has a heating element array 32 that consists of a large number of heating elements arranged in a widthwise direction of the recording paper 23. The thermal printing head 28 is disposed below the paper path 25 with the heating element array 32 in face of the paper path 25. The platen roller 29 is disposed across the paper path from the heating element array 32. A spring 33 urges the thermal printing head 28 to swing toward the platen roller 29, so as to press the heating element array 32 against the platen roller 29.

Figure 5:
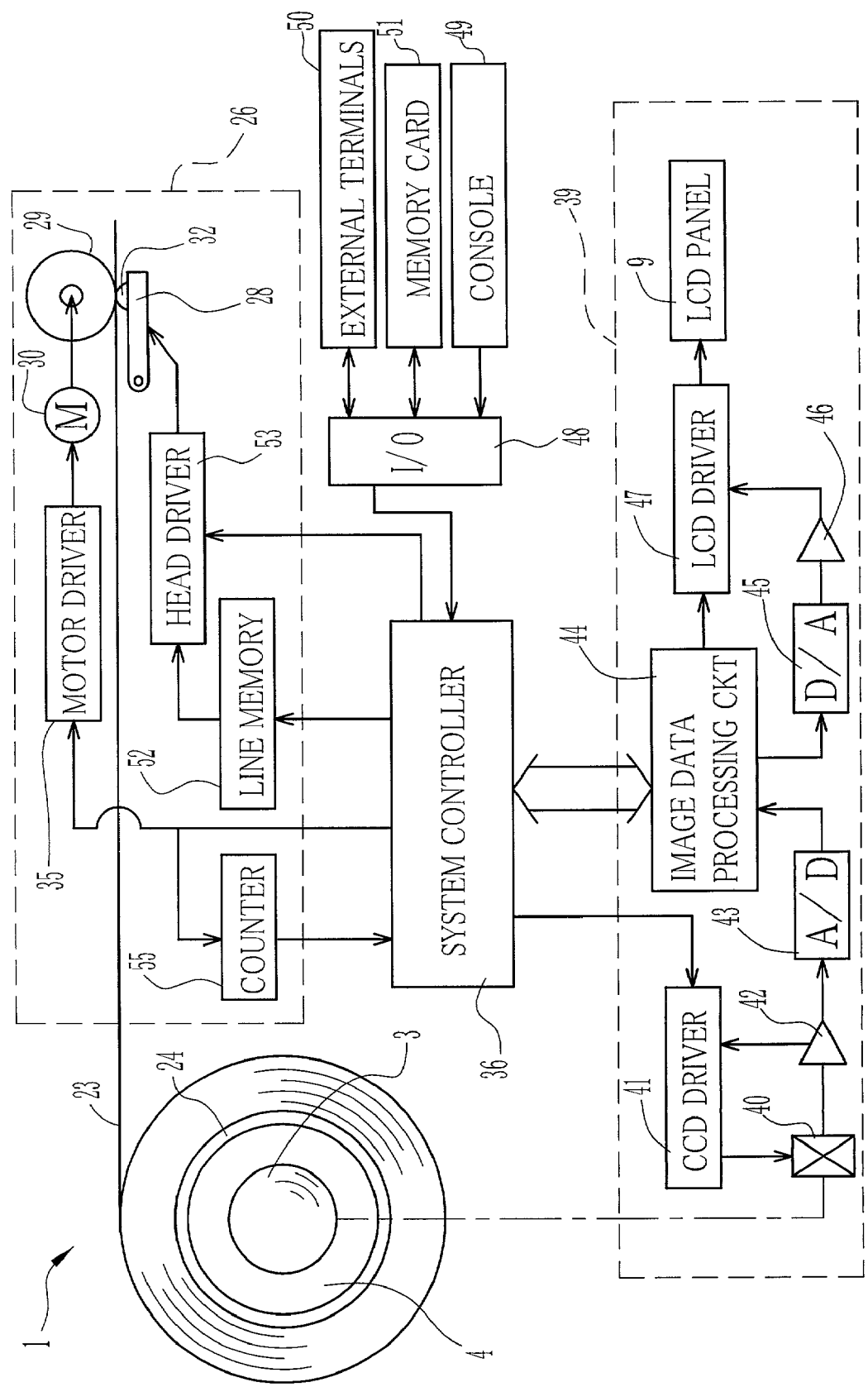
FIG. 5 shows a block diagram illustrating the circuitry of the electronic still camera of FIG. 1.

The platen roller 29 doubles as a feed roller for the recording paper 23. The platen roller 29 is mounted rotatable to the camera body 2, and has an coaxial gear 34 on its one end. The gear 34 is in mesh with the transmission gear 31, so the rotational movement of the motor 30 is transmitted through the transmission gear 31 to the platen roller 29. As shown in FIG. 5, the motor 30 is driven by a motor driver 35 under the control of a system controller 36. As the motor 30 rotates in a counterclockwise direction in FIG. 4, the platen roller 29 rotates in the counterclockwise direction, thereby feeding the recording paper 23 toward the paper exit 6, as shown by an arrow F.

The cutter 27 consists of a knife 37 and an operation member 38 that is secured to the knife 37 and exposed to the outside of the camera body 2. The cutter 27 is mounted movable in a perpendicular direction to the paper path 25, between a cutting position where the knife 37 enter the paper path 25 and a rest position retracted from the paper path 25. To cut the recording paper 23, the operation member 38 is slid upward to move the knife 37 to the cutting position.

In the electronic still camera 1 with the printer section 26, the system controller 36 controls both the printer section 26 and a camera section 39, as shown in FIG. 5. In the camera section 39, a CCD image sensor 40 is located behind the taking lens 3, and is driven by a CCD driver 41 to convert an optical image, as formed through the taking lens 3, into electronic image signals. The image signals are amplified through an amplifier 42 up to an appropriate level, and are converted into digital image data through an A/D converter 43.

The image data are supplied sequentially to an image data processing circuit 44, and processed therein for correcting image quality. The image data processing circuit 44 also produces picture signals from the processed image data, and outputs the picture signals to an LCD driver 47 via a D/A converter 45 and an amplifier 46. Based on the picture signals, the LCD driver 47 drives the LCD panel 9 to display moving images of the subject as photographed through the taking lens 3. Thus the LCD panel 9 serves as an electronic viewfinder in addition to an information display device.

An I/O port 48 is connected to the system controller 36, so the system controller 36 monitors signals from a console 49 including the power switch 7, the print button 8, the operation dial 11 and other operation buttons, and signals from external terminals 50. A memory card 51 is connectable to the I/O port 48, so the image data obtained from the image data processing circuit 44 may be written on the memory card 51, or image data stored in the memory card 51 may be read into the system controller 36. For example, the memory card 51 may store image data of 50 still picture frames.

Besides the thermal printing head 28, the platen roller 29, the motor 30 and the transmission gear 31, the printer section 26 includes the motor driver 35, a line memory 52, a head driver 53 and a counter 55. To print an image, the system controller 36 writes image data of that image line after line on the line memory 52, and controls the head driver 53 to drive the thermal printing head 28 in accordance with the image data read out from the line memory 52. More specifically, the head driver 53 controls heat energies generated from the individual heating elements of the heating element array 32 in accordance with the image data of each line, thereby to record dots at variable densities on the recording paper 23 in a line sequential fashion. The counter 55 counts the number of drive pulses applied to the motor 30, so the system controller 36 measures an advanced length of the recording paper 23 with reference to the count of the counter 55.

Now the operation of the electronic still camera 1 with the printer section 26 will be described.

To load the paper roll 17, the unlatch button 18 is first pressed to unlatch the lid 14, and then the lid 14 is opened to expose the paper roll chamber 16. After removing the reel 24 of the used paper roll 17, which may remain in the paper roll chamber 16, the paper roll 17 is loaded in the paper roll chamber 16 by fitting the center hole 24a of the reel 24 on the lens barrel 4. Thereafter when the lid 14 is closed and latched, loading of the paper roll 17 is completed.

After the power switch 7 is pressed to power the electronic still camera 1, the operation dial 11 is operated to chose between a photography mode and a reproduction mode.

In the photography mode, the CCD image sensor 40 is driven continuously to pick up image signals from the subject, and moving images of the subject are displayed on the LCD panel 9. The photographer may frame the subject while observing the LCD panel 9 or looking into the eyepiece window 10 of the real image type viewfinder 10. Upon the shutter button 12 being pressed, image data of one frame as displayed at that moment on the LCD panel 9 are written on the memory card 51.

In the reproduction mode, the photographer may choose an appropriate picture frame from among those picture frames whose image data are stored in the memory card 51, by operating the operation buttons. Then the image data of the chosen picture frame are sent to the LCD driver 47 via the D/A converter 45 and the amplifier 47, so the LCD panel 9 displays the chosen picture frame. Upon the print button 8 being pressed in this condition, the system controller 36 reads out the image data of the chosen picture frame line by line from the memory card 51, and transfers the image data of one line to the line memory 52. Thereafter, the system controller 36 sends the image data of one line sequentially from the line memory 52 to the head driver 53. Then, the head driver 53 drives the heating elements of the heating element array 32 to apply different amounts of heat energies to the recording paper 23 in accordance with the image data of one line. The different heat energies cause the recording paper 23 to develop a line of color dots at different densities along the heating element array 32, i.e. across the width of the recording paper 23.

During the printing, the motor 30 is driven intermittently to advance the recording paper 23 by a constant length after each printing of one line, the constant length being equivalent to a length of one line in the lengthwise direction of the recording paper 23. While the first line being printed, the system controller 36 transfers the image data of a second line of the chosen picture frame from the memory card 51 to the line memory 52, so the thermal printing head 28 heats the recording paper 23 to print the second line next to the first line on the recording paper 23. In this way, the chosen picture frame is printed line after line while the recording paper 23 is advanced intermittently in the direction F. The size of frame recording area on the recording paper 23 is predetermined, so the system controller 36 determines when and where to start and stop recording each picture frame with reference to the count of the counter 55. After the printing of one picture frame, the motor 30 is further driven to rotate the platen roller 29 in the direction to eject the recording paper 23. After the chosen picture frame is entirely printed, the platen roller 29 is rotated further to place a trailing end of the printed picture frame at the cutter 27. In this position, the recording paper 23 partly protrudes outside the paper exit 7. When the platen roller 29 and thus the recording paper 23 stop, the photographer may slide the operation member 38 upward to cut off the printed portion of the recording paper 23 into a piece of hard copy of the chosen picture frame.

As described above, since the paper roll chamber 16 is provided around the lens barrel 4, the recording paper 23 on the reel 24 has large radii of curvature so that the recording paper 23 does not get curled strongly, and the number of prints available from one paper roll 17 is increased without compromising compactness of the electronic still camera 1.

Figure 6:
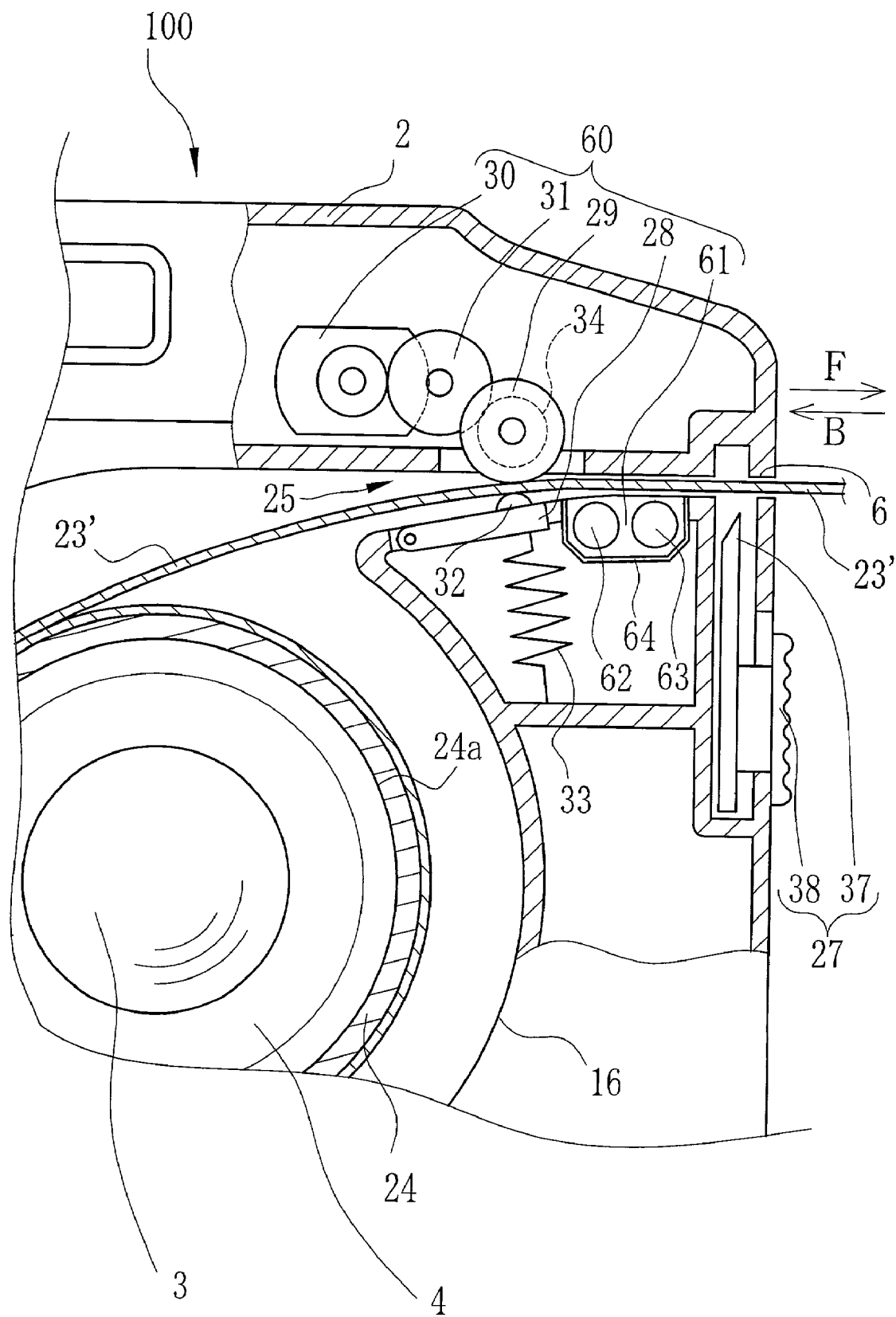
FIG. 6 shows a front view, partly broken away and partly in section, of a electronic still camera with a color thermal printer section, according to a second embodiment of the present invention.

Although the thermal printer section 26 of the above-described electronic still camera 1 is monochromatic, the present invention is applicable to an electronic still camera with a color thermal printer section, as shown for example in FIG. 6. In this second embodiment and other embodiments, like or corresponding parts are designated by the same reference numbers as in the first embodiment, so the following descriptions will relate only to those features essential for the second and following embodiments.

In a color thermal printer section 60 shown in FIG. 6, a heat-sensitive color recording paper 23' is used as the recording material, wherein yellow, cyan and magenta heat-sensitive coloring layers are formed atop another. The color thermal printer section 60 is constituted of a thermal printing head, a platen roller 29, a motor 30, a transmission gear 31 and an optical fixing device 61. The optical fixing device 61 consists of a yellow fixing lamp 62 radiating near-ultraviolet rays having an emission peak at 420 nm or 450 nm, which destroy coloring ability of the yellow coloring layer, and a magenta fixing lamp 63 radiating ultraviolet rays having an emission peak at 365 nm, which destroy coloring ability of the magenta coloring layer, and a reflector 64 covering rear sides of these lamps 62 and 63 to reflect the rays toward the recording paper 23'.

In the second embodiment, three-color image data are stored in a card memory 51, and are read out from the card memory 51 in a color frame sequential fashion. Specifically, in response to a print command entered by pressing a print button 8, yellow image data of a designated picture frame are first transferred line after line to a line memory 52, so a yellow frame of the designated picture frame is recorded line by line in a frame recording area of the recording paper 23', as the recording paper 23' is fed in a forward direction F from a paper roll chamber 16 to a paper exit 6. While the yellow frame is being recorded, the yellow fixing lamp 62 is turned on to fix the recorded yellow frame by destroying coloring ability of the yellow coloring layer within the frame recording area. The platen roller 29 is rotated to feed the recording paper 23' in the forward direction F till a trailing end of the frame recording area comes under the yellow fixing lamp 62.

Thereafter, the platen roller 29 is rotated reversely to feed the recording paper 23' in a backward direction B till a leading end of the frame recording area is placed at a heating element array 32 of the thermal printing head 28. Then the printer section 60 starts recording a magenta frame of the designated picture frame in accordance with the magenta image data, line by line as the recording paper 23' is fed in the forward direction F, in the same way as described with respect to the yellow frame. During the magenta frame recording, the magenta fixing lamp 63 is turned on to fix the recorded magenta frame. After the entire frame recording area having the yellow and magenta frames recorded thereon is exposed to the ultraviolet rays from the magenta fixing lamp 63, the recording paper 23' is fed back to place the leading end of the frame recording area at the heating element array 32.

Then the thermal printing head 28 begins to record a cyan frame of the designated picture frame line by line on the cyan coloring layer within the frame recording area, in the same way as for the yellow and magenta frames. Since the cyan coloring layer has such a low heat-sensitivity that it hardly develop color under usual keeping conditions, the optical fixation is not done on the cyan coloring layer. After a full color image of the designated picture frame is recorded in this way, the platen roller 29 is rotated to feed the recording paper 23' further in the forward direction till the trailing end of the frame recording area is placed at the cutter 27. Then the operation member 38 is slid up to cut the recording paper 23' by the knife 37 of the cutter 27, thereby providing a piece of hard copy of the designated picture frame.

Figure 7:
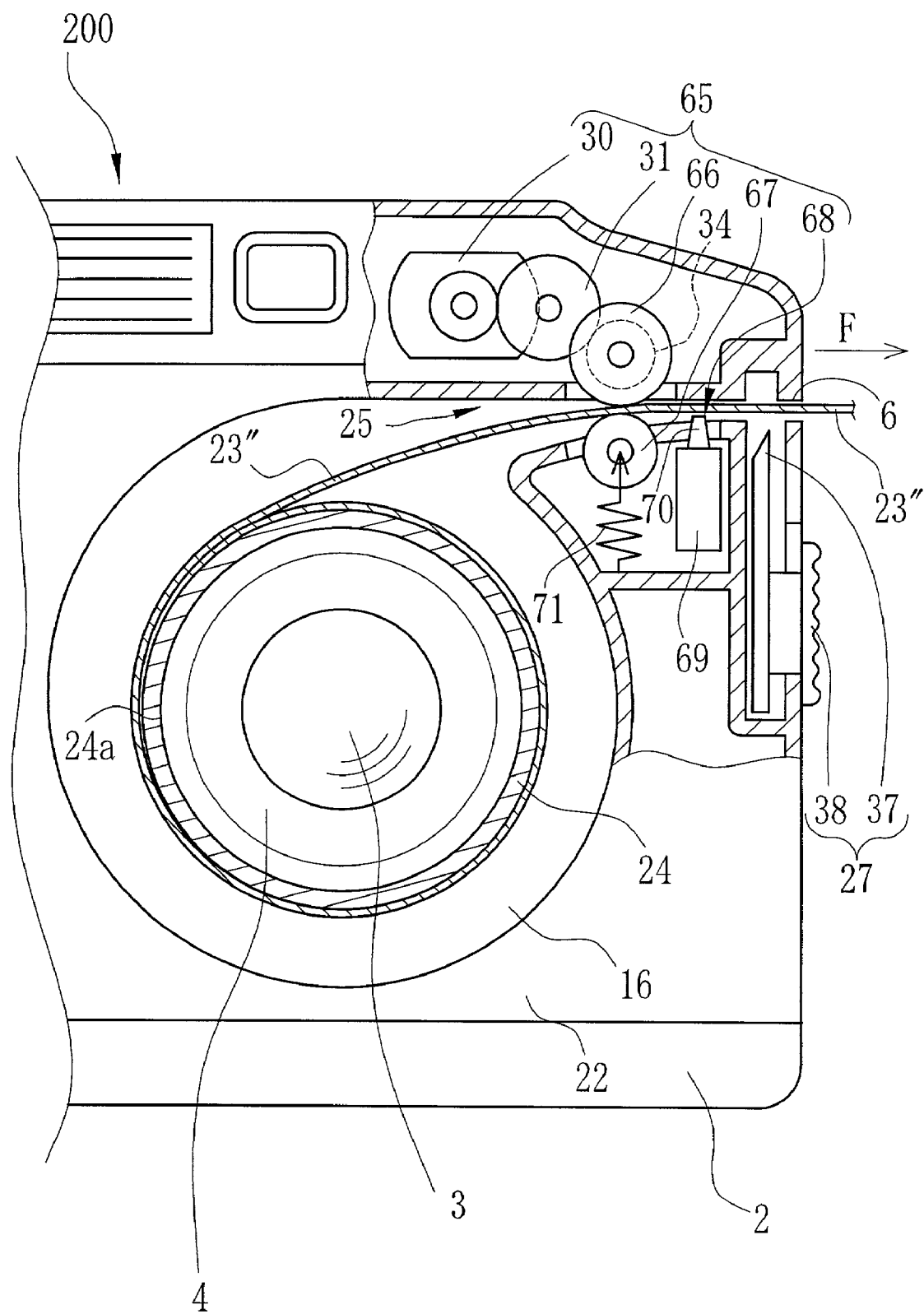
FIG. 7 shows a front view, partly broken away and partly in section, of a electronic still camera with an ink-jet printer section, according to a third embodiment of the present invention.

The present invention is applicable not only to an electronic still camera with a thermal printer section, but also to an electronic still camera with an ink-jet printer section. FIG. 7 shows an embodiment of an electronic still camera 200 with an ink-jet printer section 65. The ink-jet printer section 65 is constituted of a capstan roller 66, a nip roller 67, a motor 30, a transmission gear 31 and an ink-jet printing head 68. The ink-jet printing head 68 is of a monochromatic type that ejects a black ink, so the head 68 has an ink tank 69 containing the black ink, and an array of ink nozzles 70 connected to the ink tank 69. The ink nozzles 70 are arranged along a widthwise direction of recording paper 23".

The capstan roller 66 is driven by the motor 30. The nip roller 67 is mounted across a paper path from the capstan roller 66, and is urged by a spring 71 to contact the capstan roller 66. The recording paper 23" is nipped between the nip roller 67 and the capstan roller 66, and is fed in a forward direction F by the rotational movement of the capstan roller 66. Also in this embodiment, the printing head 68 records a line of ink dots at a time on the recording paper 23", and the recording paper 23" is fed intermittently by a length corresponding to one line after each recording of one line.

Figure 8:
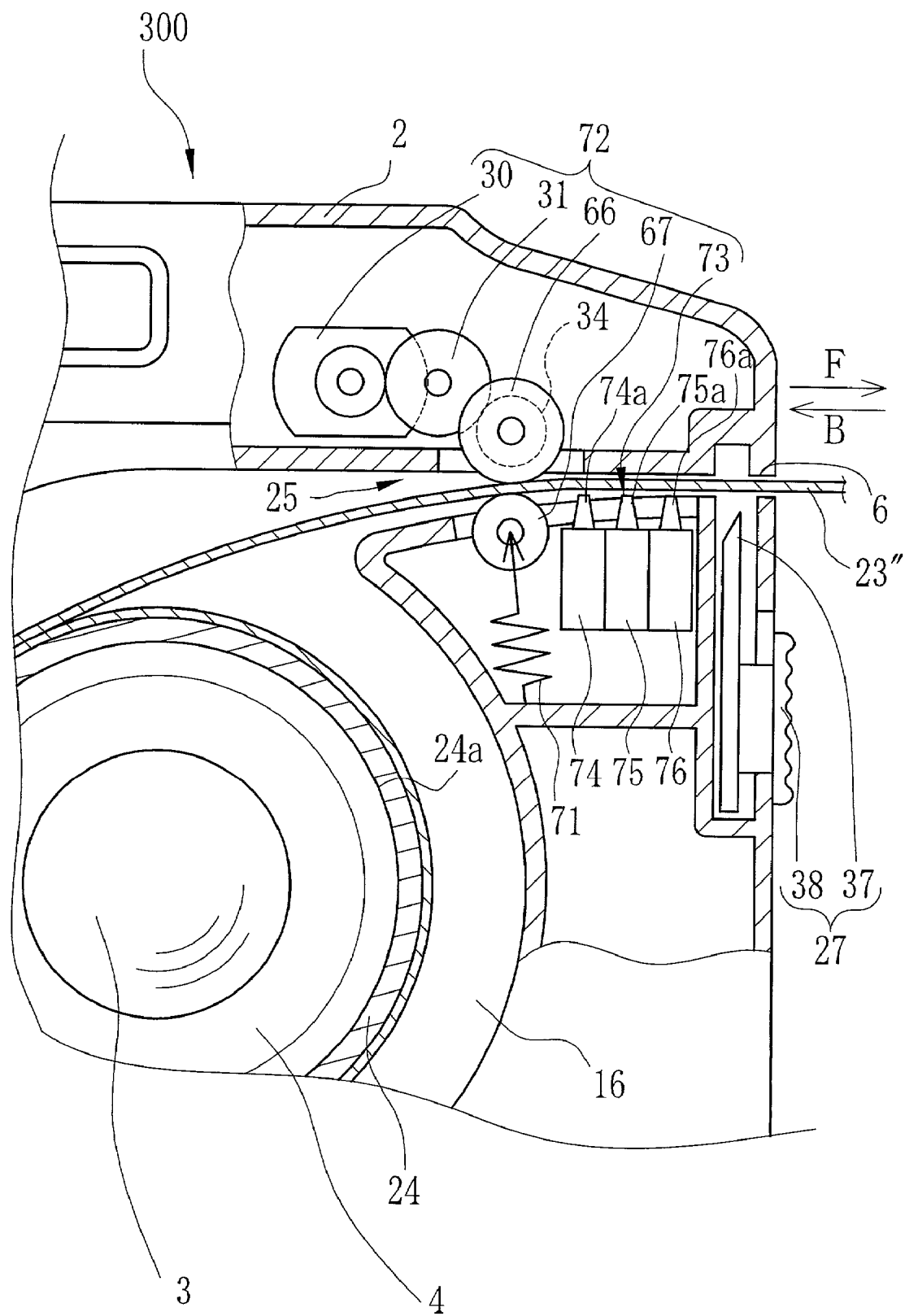
FIG. 8 shows a front view, partly broken away and partly in section, of a electronic still camera with a color ink-jet printer section with three color printing heads, according to a fourth embodiment of the present invention.

It is also possible to integrate a color ink-jet printer section 72 into an electronic still camera 300, as shown in FIG. 8. The color ink-jet printer section 72 is provided with a color ink-jet printing head 73 that has three color ink tanks 74, 75 and 76 containing yellow, magenta and cyan inks respectively, and three rows of ink nozzles 74a, 75a and 76a, each row extending in the widthwise direction of the recording paper 23". The nozzles 74a of one row are connected to the yellow ink tank 74, the nozzles 75a of a second row are connected to the magenta ink tank 75, and the nozzles 76a of a third row are connected to the cyan ink tank 76.

In the electronic still camera 300 with the color ink-jet printer section 72, the color ink-jet printing head 73 is first driven to eject the yellow ink from the nozzles 74a in accordance with yellow image data of a first line of a picture frame. Thereby a line of yellow dots are recorded on the recording paper 23". Thereafter, the recording paper 23" is fed in a forward direction F by a length corresponding to one line. Then, the color ink-jet printing head 73 is driven to eject the yellow ink from the nozzles 75a in accordance with yellow image data of a second line of the picture frame. After a yellow frame is recorded in this way, the recording paper 23" begins to be fed in a backward direction B, till the first line of the recorded yellow frame is placed at the nozzles 75a for the magenta ink. Then, the color ink-jet printing head 73 is driven to eject the magenta ink from the nozzles 75a in accordance with magenta image data of the picture frame, to record a magenta frame line by line on the yellow frame. A cyan frame of the same picture frame is recorded line by line in the same way in the same way as for the yellow and magenta frames. Thus a full-color image is recorded on the recording paper 23" in a color frame sequential fashion.

In the above embodiments, the recording paper 23, 23' or 23" is fed through the paper path 25 by means of the platen roller 29 or the capstan roller 66, which is disposed in the paper path 25. It is possible to provide at least a feed roller in the paper roll chamber 16 such that the feed roller is kept in contact with the outermost convolution of the paper roll 17, for example by an urging force of a spring. In that case, the feed roller is driven by a motor, and the rotational movement of the feed roller causes the paper roll 17 to rotate to feed the recording paper out of the paper roll chamber 16.

The cutter may also be modified appropriately. For example, it is possible to provide a cutter that is electrically activated in response to an operation button. The taking lens 3 may be a zoom lens. In that case, the lens barrel should be constituted of a fixed barrel and a movable barrel mounted inside the fixed barrel and protruded out of the fixed barrel to set the taking lens at a longer focal length.

Although the present invention has been described with respect to the preferred embodiments, the present invention is not to be limited to the above embodiments but, on the contrary, various modifications will be possible to those skilled in the art without departing from the scope of claims appended hereto.

What is claimed is:

1. An electronic still camera comprising:
   a camera section for obtaining electronic image data from a subject photographed through a taking lens;

a printer section for printing an image on recording paper on the basis of said image data; and a paper roll chamber formed to enclose around a lens barrel of said taking lens, to hold a roll of said recording paper rotatably around said lens barrel; and a lid rotatable between an open position for opening said paper roll chamber and a closed position for closing said paper roll chamber, wherein said lid forms only a part of a front wall of the camera in said closed position, and said lid opens and closes said paper roll chamber directly.

2. An electronic still camera as recited in claim 1, wherein said lid includes an opening for exposing said taking lens while said lid is in said closed position.

3. An electronic still camera as recited in claim 2, wherein said front wall of said camera comprises a substantially flat front wall.

4. An electronic still camera as recited in claim 1, further comprising a paper feeding device for feeding said recording paper out from said paper roll chamber to said printer section through a paper path, said paper feeding device comprising at least a feed roller disposed in one of said paper path and said paper roll chamber.

5. An electronic still camera as recited in claim 4, further comprising a paper exit formed through a side wall of said camera, for ejecting a leading portion of said recording paper out of said camera after an image is printed on said leading portion by said printer section, and a cutter disposed near said paper exit, for cutting off said leading portion of said recording paper.

6. An electronic still camera as recited in claim 5, wherein said cutter comprises a knife mounted inside said camera so as to be slidable in a perpendicular direction to said recording paper as being fed along said paper path, and an operation member mounted outside said camera so as to be slidable together with said knife, said operation member being manually operated to have said knife cut said leading portion along a transverse line to said recording paper.

7. An electronic still camera as recited in claim 5, wherein said paper path extends from an upper portion of said paper roll chamber to said paper exit, and said printer section being disposed around said paper path.

8. An electronic still camera as recited in claim 1, wherein said recording paper comprises a heat-sensitive recording paper including at least a heat-sensitive coloring layer, and said printer section comprises a thermal printing head driven in accordance with said image data to heat said heat-sensitive coloring layer to develop a color.

9. An electronic still camera as recited in claim 1, wherein said printer section comprises an ink-jet bead driven in accordance with said image data to eject ink toward said recording paper.

10. An electronic still camera as recited in claim 1, wherein said camera includes said front wall including said taking lens and a back wall including an eyepiece of a view finder, and wherein said lid is disposed on said front wail of said camera and includes an opening for exposing said taking lens while said lid is in said closed position.

11. An electronic still camera as recited in claim 1, wherein said lid is rotatably attached to said camera.

12. An electronic still camera as recited in claim 1, wherein said camera includes said front wall including said taking lens and a boric wall including an eyepiece of a view finder.

13. An electronic still camera as recited in claim 1, wherein said lid is rotatable about a hinge.

14. An electronic still camera as recited in claim 1, wherein said lid is rotatable about a hinge which is disposed on a first side wall of said camera, and wherein said first side wall is opposite a second side wall of said camera, which includes a grip.

15. An electronic still camera as recited in claim 1, wherein said front wall of said camera includes a recessed portion formed around said paper roll chamber.

16. An electronic still camera as recited in claim 15, wherein said recessed portion includes at least one of a contour and a depth substantially corresponding to a contour and a thickness of said lid.

17. An electronic still camera as recited in claim 16, wherein, when said lid is disposed in the closed position, said lid at least one of fits in said recessed portion in the closed position and is aligned with said front wall of the camera.

18. An electronic still camera comprising:

a camera body;

means far obtaining electronic image data from a subject photographed through a taking lens of said camera body;

means for printing an image on recording paper on the basis of said image data;

means for holding a roll of said recording paper rotatably around a lens barrel of said taking lens; and means for accessing said means for holding through said camera body, wherein said means for accessing is rotatably attached to said camera body.

* * * * *